US012777136B2

(12) United States Patent
Smolik et al.

(10) Patent No.: US 12,777,136 B2
(45) Date of Patent: Oct. 27, 2026

(54) LIGHT-FIELD PROJECTOR GENERATING OPTICALLY CORRECTED VIRTUAL IMAGES AND METHOD OF GENERATING CORRECTED VIRTUAL IMAGES BY USING THE LIGHT FIELD PROJECTOR

(71) Applicant: Creal SA, Ecublens VD (CH)

(72) Inventors: Grégoire Smolik, Chavannes-Près-Renens (CH); Grégoire Hirt, Chavannes-Près-Renens (CH)

(73) Assignee: Creal SA, Ecublens VD (CH)

( * ) Notice: Subject to any disclaimer, the term of this patent is extended or adjusted under 35 U.S.C. 154(b) by 0 days.

(21) Appl. No.: 18/695,768

(22) PCT Filed: Sep. 28, 2021

(86) PCT No.: PCT/IB2021/058833
§ 371 (c)(1),
(2) Date: Mar. 26, 2024

(87) PCT Pub. No.: WO2023/052809
PCT Pub. Date: Apr. 6, 2023

(65) Prior Publication Data
US 2024/0406358 A1 Dec. 5, 2024

(51) Int. Cl.
*H04N 9/31* (2006.01)

(52) U.S. Cl.
CPC ......... *H04N 9/3185* (2013.01); *H04N 9/3164* (2013.01)

(58) Field of Classification Search
None
See application file for complete search history.

(56) References Cited

U.S. PATENT DOCUMENTS

2004/0053143 A1* 3/2004 Sandstrom .......... G03F 7/70291 430/5
2016/0042501 A1 2/2016 Huang et al.
(Continued)

FOREIGN PATENT DOCUMENTS

WO 2021038430 A1 3/2021
WO 2021122640 A1 6/2021

OTHER PUBLICATIONS

A. Maimone et al., "High Efficiency Near-Eye Light Field Display." ACM Trans. Graph. Article, 2015. XP055433366. URL:https://cs.unc.edu/~maimone/media/Maimone_GTC2015.pdf.
(Continued)

*Primary Examiner* — Eileen M Adams
(74) *Attorney, Agent, or Firm* — BLANK ROME LLP

(57) ABSTRACT

A light-field projector comprising a light source configured to emit an incident light field illuminating a spatial light modulator (SLM) configured to display a reference SLM image pattern in an SLM plane. The reference SLM image pattern is configured to modulate the incident light field and generate a modulated light. A projection optic is configured to project the modulated light field along a reference optical axis such as to project a virtual image along the reference optical axis. The SLM is configured to display a corrected SLIM image pattern corresponding to the reference SLM image pattern shifted in the SLM plane, such that the virtual image is projected along an apparent projection axis that differs from the reference optical axis and such that the virtual image simulates at least an optical correction. The present disclosure further concerns a method for generating corrected virtual images by using the light field projector.

17 Claims, 13 Drawing Sheets

(56) References Cited

U.S. PATENT DOCUMENTS

| | | | | |
|---|---|---|---|---|
| 2020/0269696 | A1* | 8/2020 | Banno ................ | G02B 27/0101 |
| 2021/0231973 | A1 | 7/2021 | Macnamara et al. | |
| 2023/0375906 | A1* | 11/2023 | Doornaert .......... | G03B 21/2033 |

OTHER PUBLICATIONS

International Search Report and Written Opinion for PCT/IB2021/058833 mailed May 27, 2022, 10 pages.

* cited by examiner (a)

(b)

(a) (b)

LIGHT-FIELD PROJECTOR GENERATING OPTICALLY CORRECTED VIRTUAL IMAGES AND METHOD OF GENERATING CORRECTED VIRTUAL IMAGES BY USING THE LIGHT FIELD PROJECTOR

RELATED APPLICATIONS

This application is a national phase of PCT/IB2021/058833, filed on Sep. 28, 2021. The contents of this application are hereby incorporated by reference in its entirety.

TECHNICAL DOMAIN

The present disclosure concerns a light-field projector for projecting an image. More particularly, the present disclosure concerns a light-field projector for generating optically corrected virtual images. The present disclosure concerns a method for generating corrected virtual images by using the light field projector.

RELATED ART

The basic principles and concept of ophthalmic testing devices have not changed since their inception often more than 100 years ago. ophthalmic testing devices use refractive lenses and curved mirrors to perform optical corrections. For instance, the so-called phoropter is based on a set of refractive optical elements with different correction characteristics that present to the patient's eye an optically transformed image of a test pattern with the goal to subjectively determine the patient's refractive error and eyeglass prescription. Such devices are bulky, costly, difficult to manufacture, provide a limited set of corrections and often require several meters of free space between the device and a fixed test pattern.

Document US2016042501 discloses a system for compensating for at least one optical aberration in a vision system of a viewer viewing a display. The display comprises an array of pixels and a microlens array. Image data for an image to be displayed is received, at least one parameter related to at least one optical aberration in the vision system of a viewer is received and an aberration compensated image to be displayed is computed based on the at least one received parameter related to the vision system of a viewer and on at least one characteristic of the light field element. The aberration compensated image is displayed on the display medium, such that when a viewer whose vision system has the at least one optical aberration views the aberration compensated image displayed on the display medium through a light field element, the aberration compensated image appears to the viewer with the at least one aberration reduced or eliminated.

Document WO2021122640 discloses a system for determining refraction features of both first and second eyes of a subject. The system comprises a light field display device including a parallax barrier mask or microlens array layered on an array of pixels, and a system of localisation of the positions of the first and second eyes of the subject. The light field display device is configured to generate a first light field directed selectively toward the first eye, and, respectively, a second light field directed selectively toward the second eye. A control unit is adapted to adjust said first light field as a function of at least a first refraction parameter associated with at least a first optical aberration for said first eye and the control unit being adapted to adjust said second light field as a function of at least a second refraction parameter associated with at least a second optical aberration for the second eye.

In the above solutions, the resolution is determined by the number of microlenses or by the pitch of the parallax barrier mask. Therefore, the above solutions are able to display simple shapes (dots, lines) but do not allow for displaying more complex 3d scenes or images. The reduced number of pixels also reduces the range of available optical corrections and only allows for varying the optical corrections in a discrete manner.

SUMMARY

The present disclosure concerns a light-field projector for generating optically corrected virtual images, comprising: a light source including a plurality of point light, each point light being configured to emit an incident light field illuminating a SLM. The SLM is configured to display a reference SLM image pattern in an SLM plane, the reference SLM image pattern being configured to modulate the incident light field and generate a modulated light field in accordance with the SLM image pattern. A projection optic is configured to project the modulated light field along a reference optical axis such as to project a virtual image along the reference optical axis. The SLM is further configured to display a corrected SLM image pattern, wherein the corrected SLM image pattern corresponds to the reference SLM image pattern being shifted in the SLM plane, and wherein the corrected SLM image pattern is configured such that the projection optic projects the virtual image along an apparent projection axis that differs from the reference optical axis, such that the virtual image simulates at least an optical correction.

In one aspect, the corrected SLM image pattern corresponds to the reference SLM image pattern further comprising a geometrical distortion.

The present disclosure concerns a method for generating corrected virtual images by using the light field projector, the method comprising:

- computing at least one virtual image by using a virtual pinhole camera model imaging a virtual 3D scene and displaying a reference SLM image pattern in accordance with the computed virtual image;
- generating at least one optical correction parameter;
- modifying the reference SLM image pattern as a function of said at least one optical correction parameter to obtain a corrected SLM image pattern;
- sequentially illuminating the SLM by the incident light fields such as to generate at least one modulated light field configured to form said at least one virtual image; and
- sequentially projecting said at least one modulated light field to project said at least one virtual image simulating said at least one optical correction.

The light-field projector disclosed herein can be used as a digital ophthalmic device. More specifically, the light-field projector can replace existing devices traditionally referred to as phoropters or refractors or similar devices that use refractive or diffractive elements to produce required optical transformations and inputs to the patient's eyes.

The digital image transformation of the light-field projector can simulate a practically continuous spectrum of optical corrections that should be otherwise performed with refractive lenses. The light-field projector can simulate a plurality of optical corrections to a single image.

The light-field projector does not require costly precision optical elements and can be smaller than conventional ophthalmic devices, yet it provides a wider and finer range and higher versatility of optical corrections.

In contrast to the known solutions, the light-field projector allows using the full resolution of the SLM such that it can display complex 3d scenes or images and allow for a wider range of available optical corrections and for varying the optical corrections in a continuous manner.

The light-field projector can be used as a display in 3D visualisation systems, such as Virtual or Augmented Reality headsets or smart glasses, where it can perform automated ophthalmic testing and/or correction, thus eliminating the need for prescription inserts or mechanical adjustments.

SHORT DESCRIPTION OF THE DRAWINGS

Exemplar embodiments of the invention are disclosed in the description and illustrated by the drawings in which.

Figure 3:
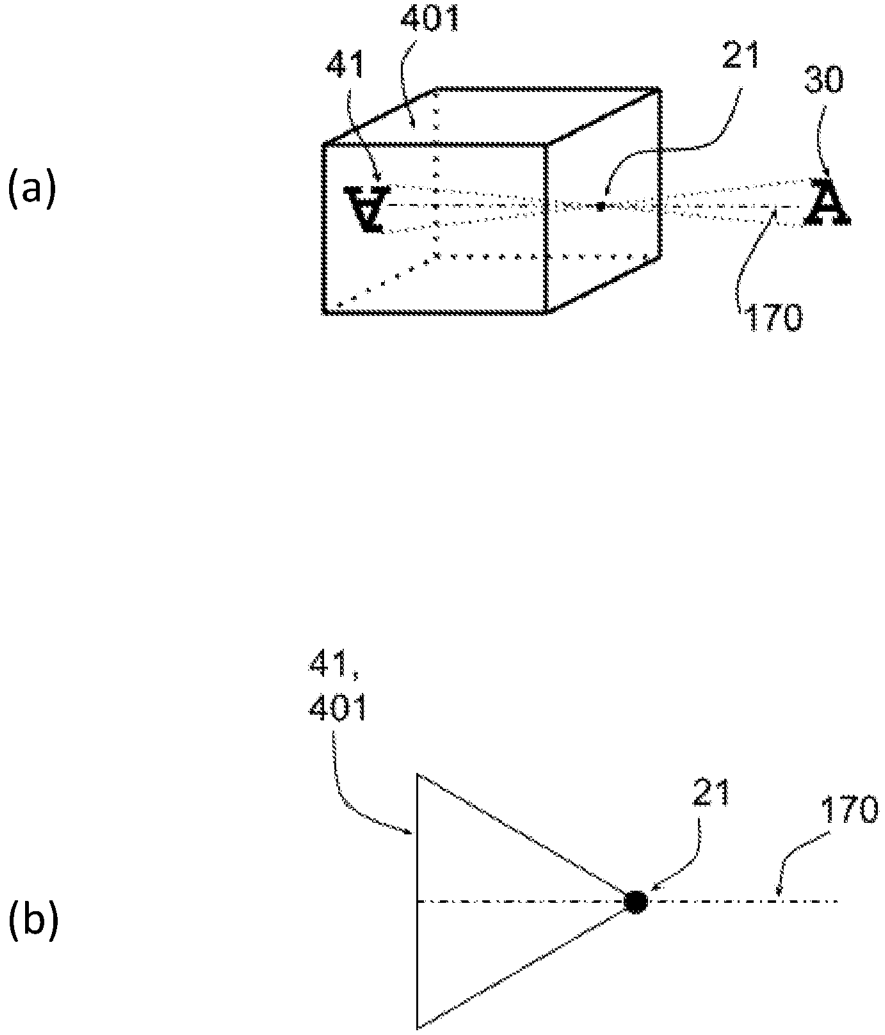

FIG. 3*a* shows a representation of a virtual pinhole camera;

FIG. 3*b* shows a two-dimensional representation of the pinhole camera of FIG. 3*a;*

Figure 4:
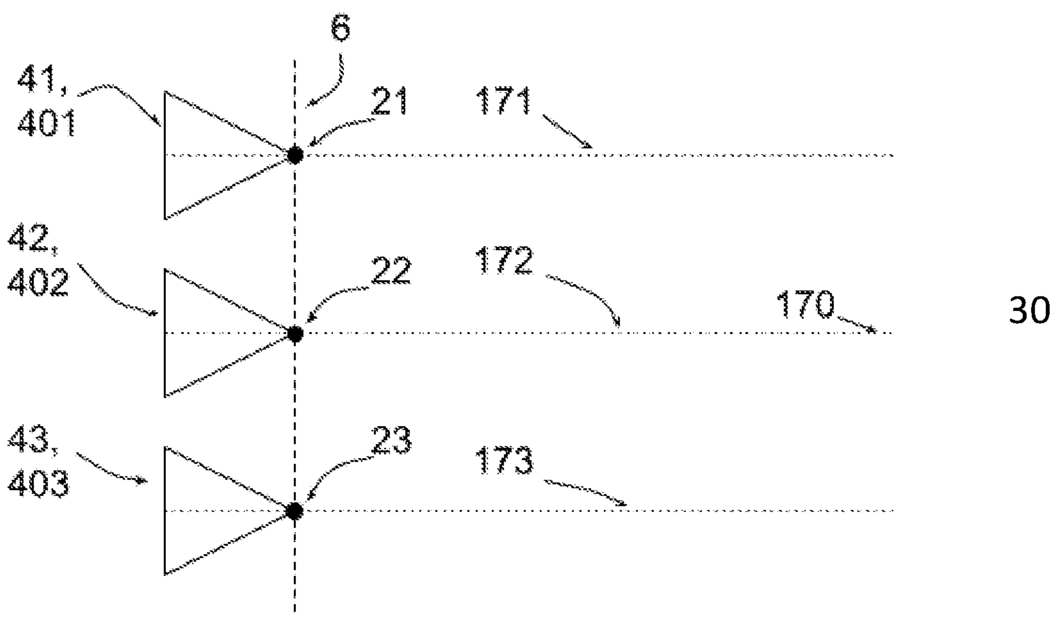
Figure 5:
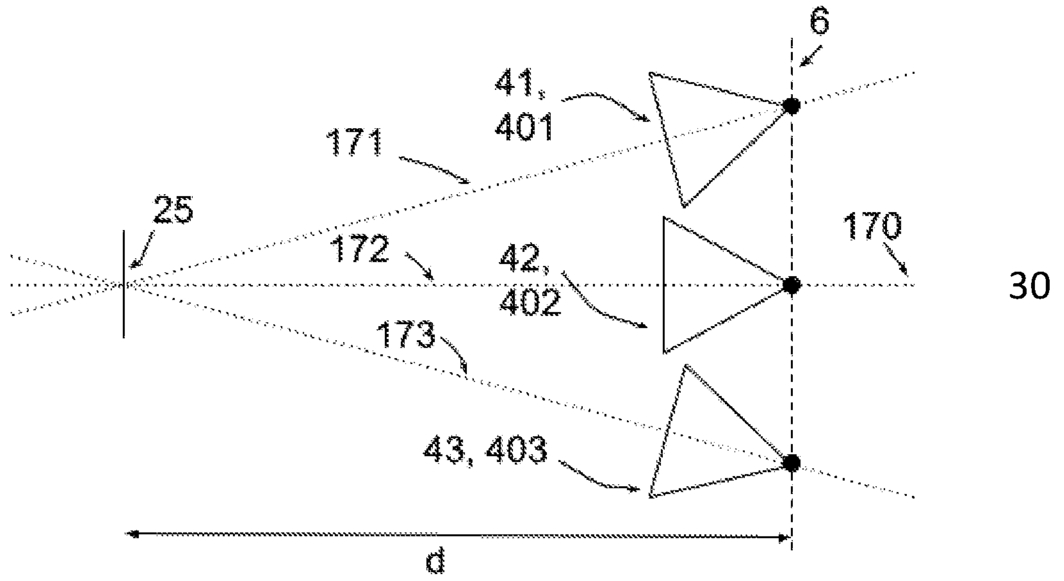
Figure 6:
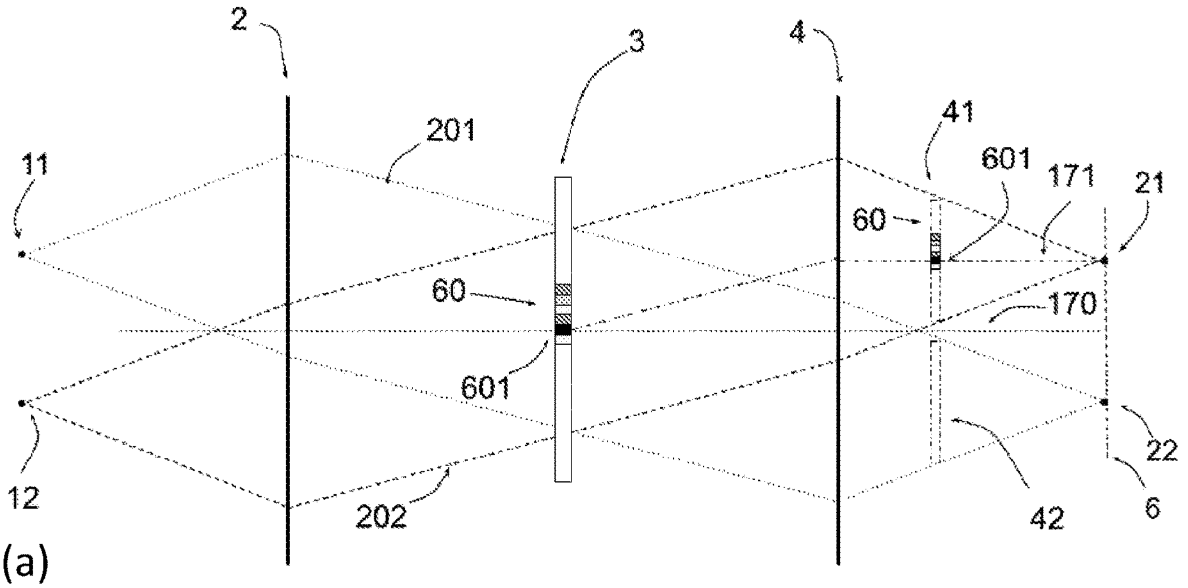
Figure 6:
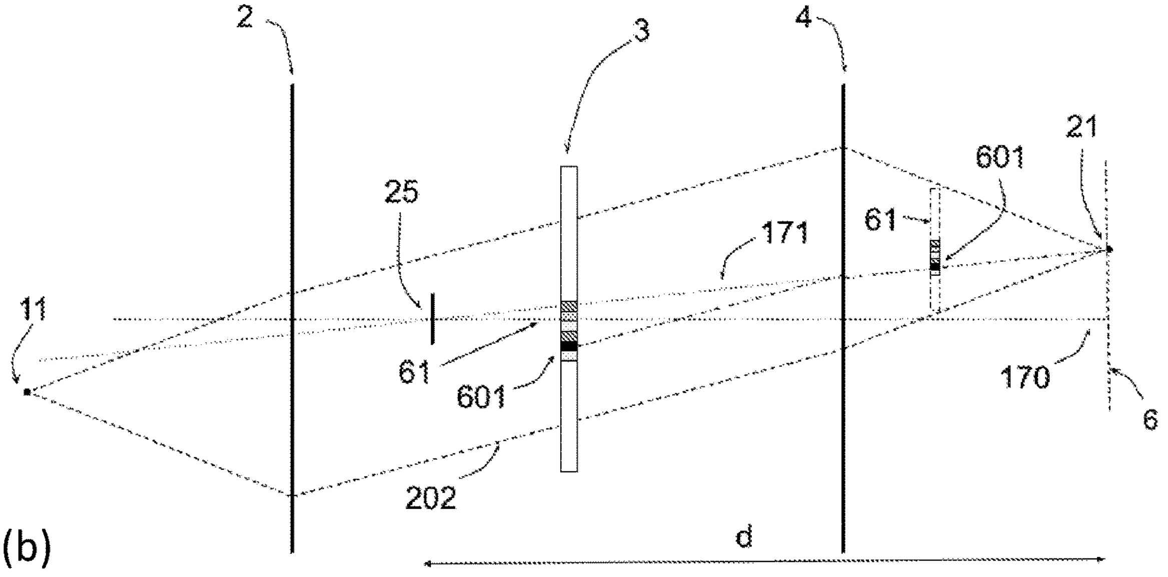
Figure 7:
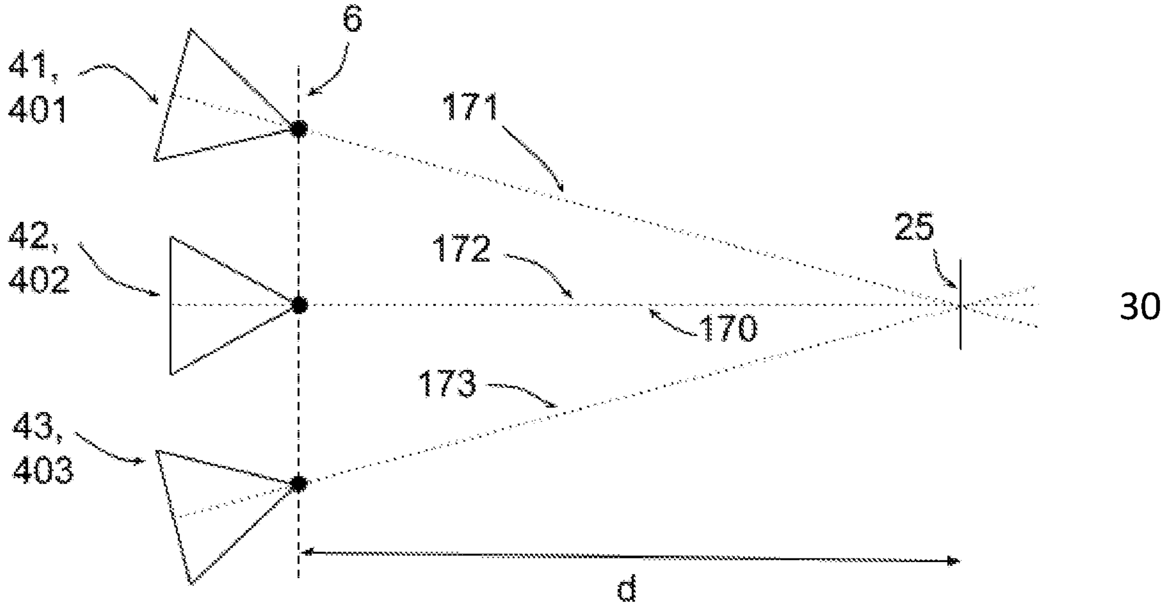
Figure 8:
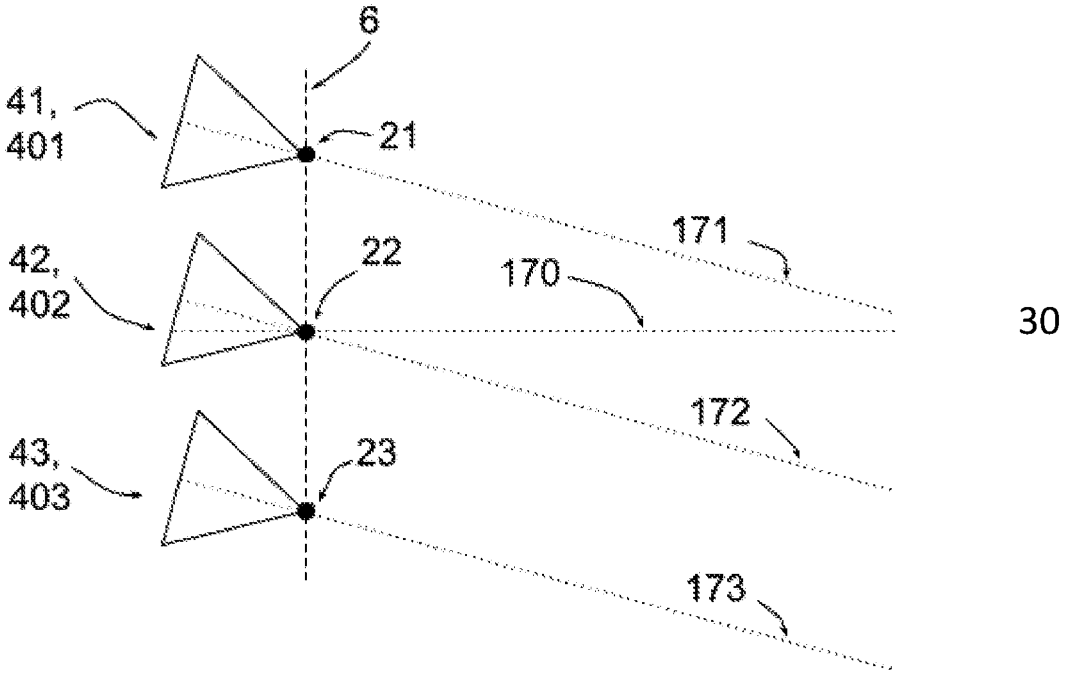
Figure 9:
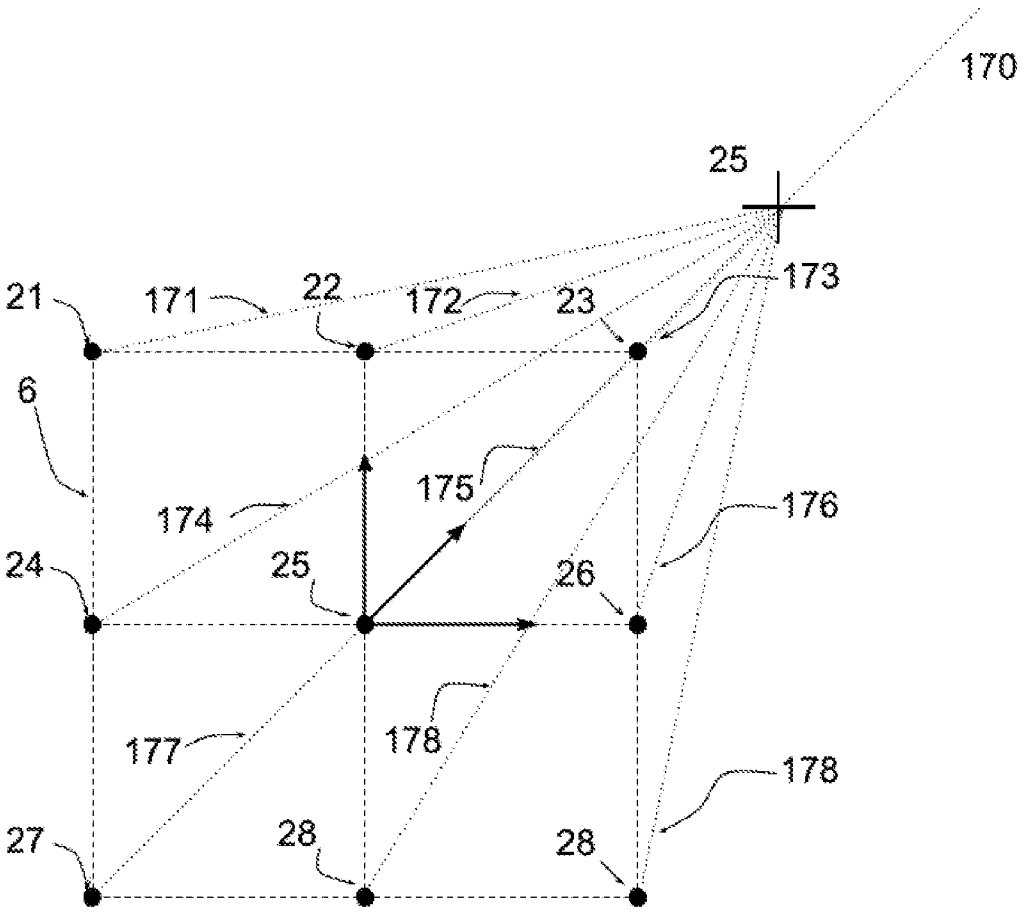
Figure 10:
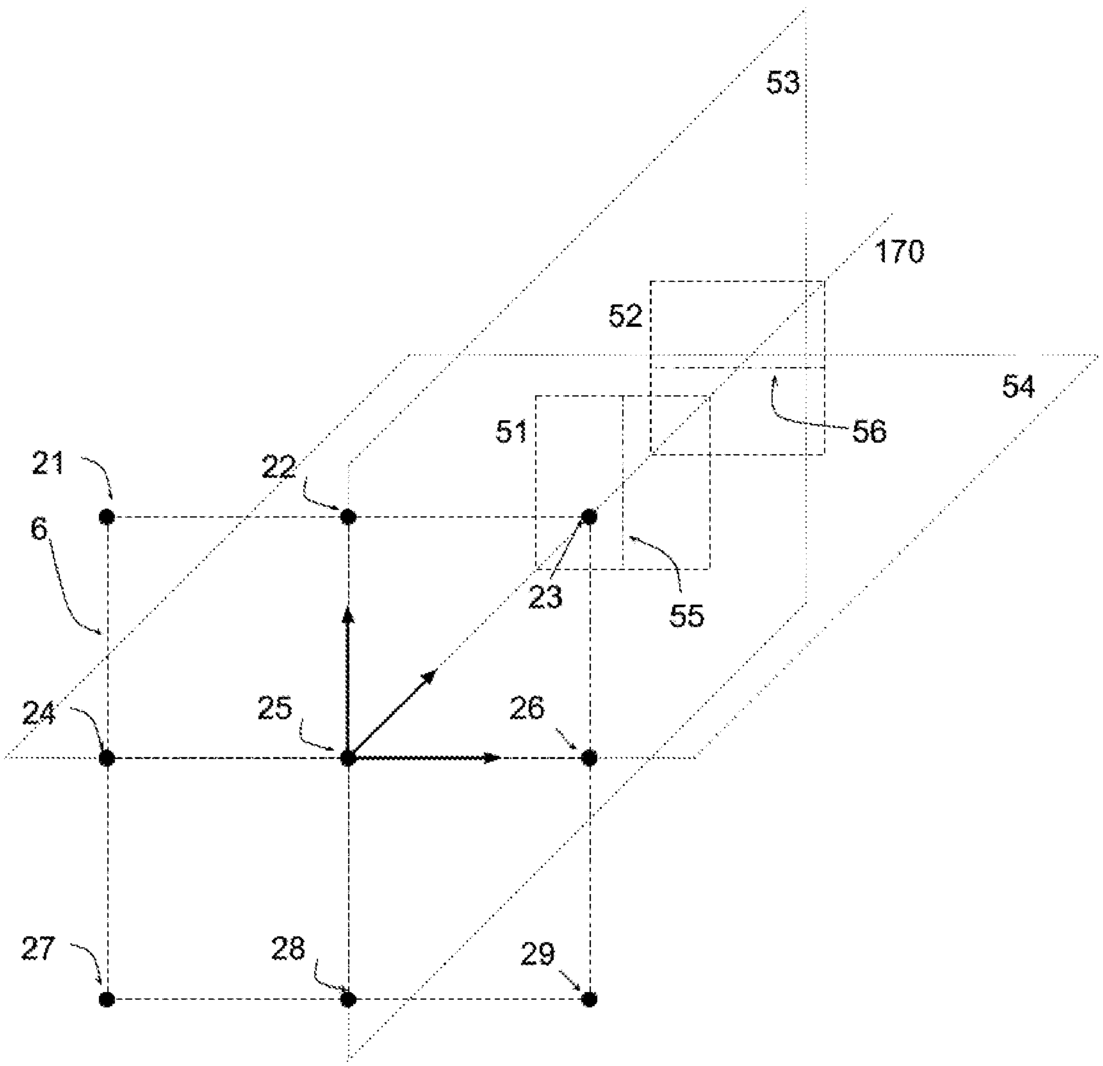
Figure 11:
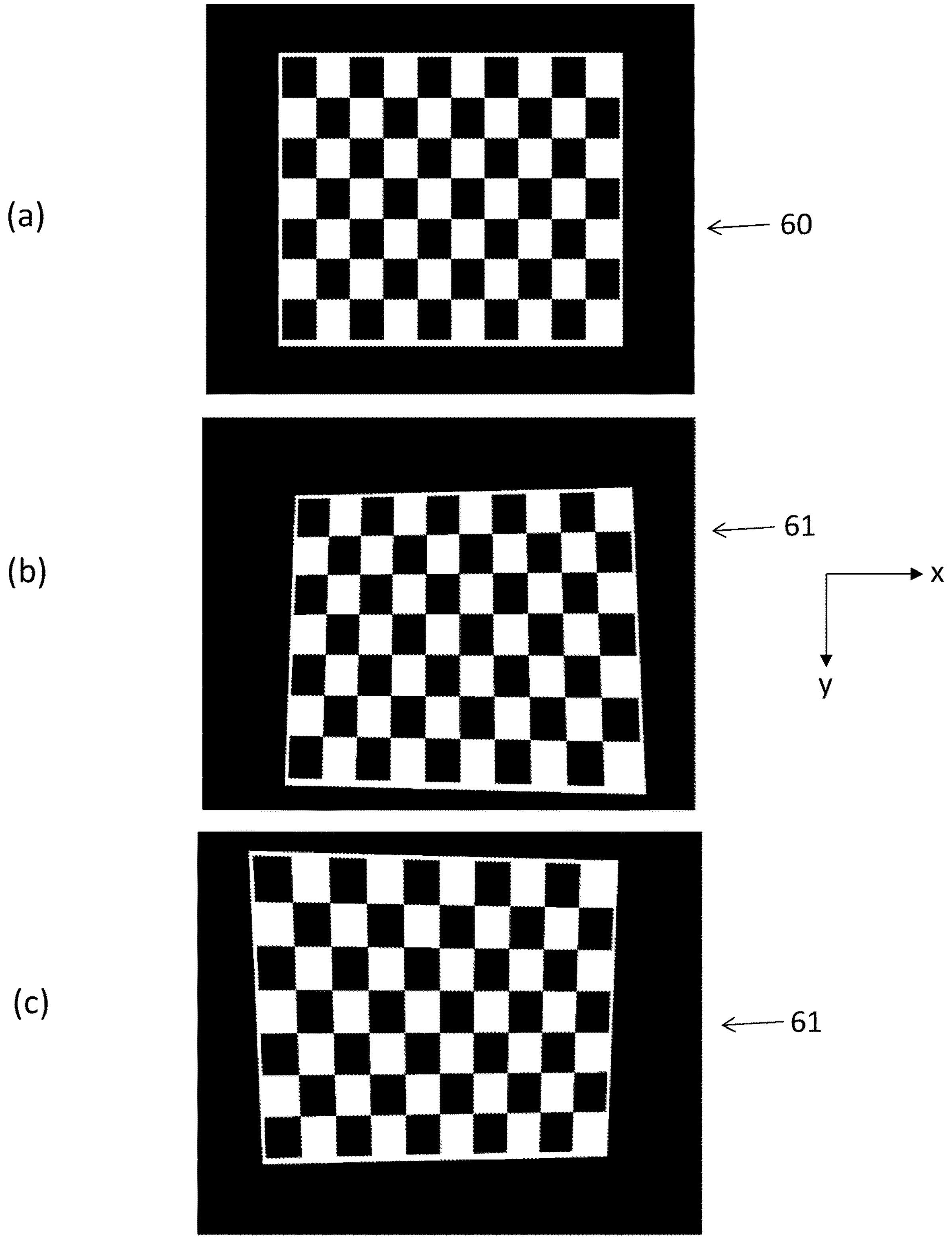
Figure 11:
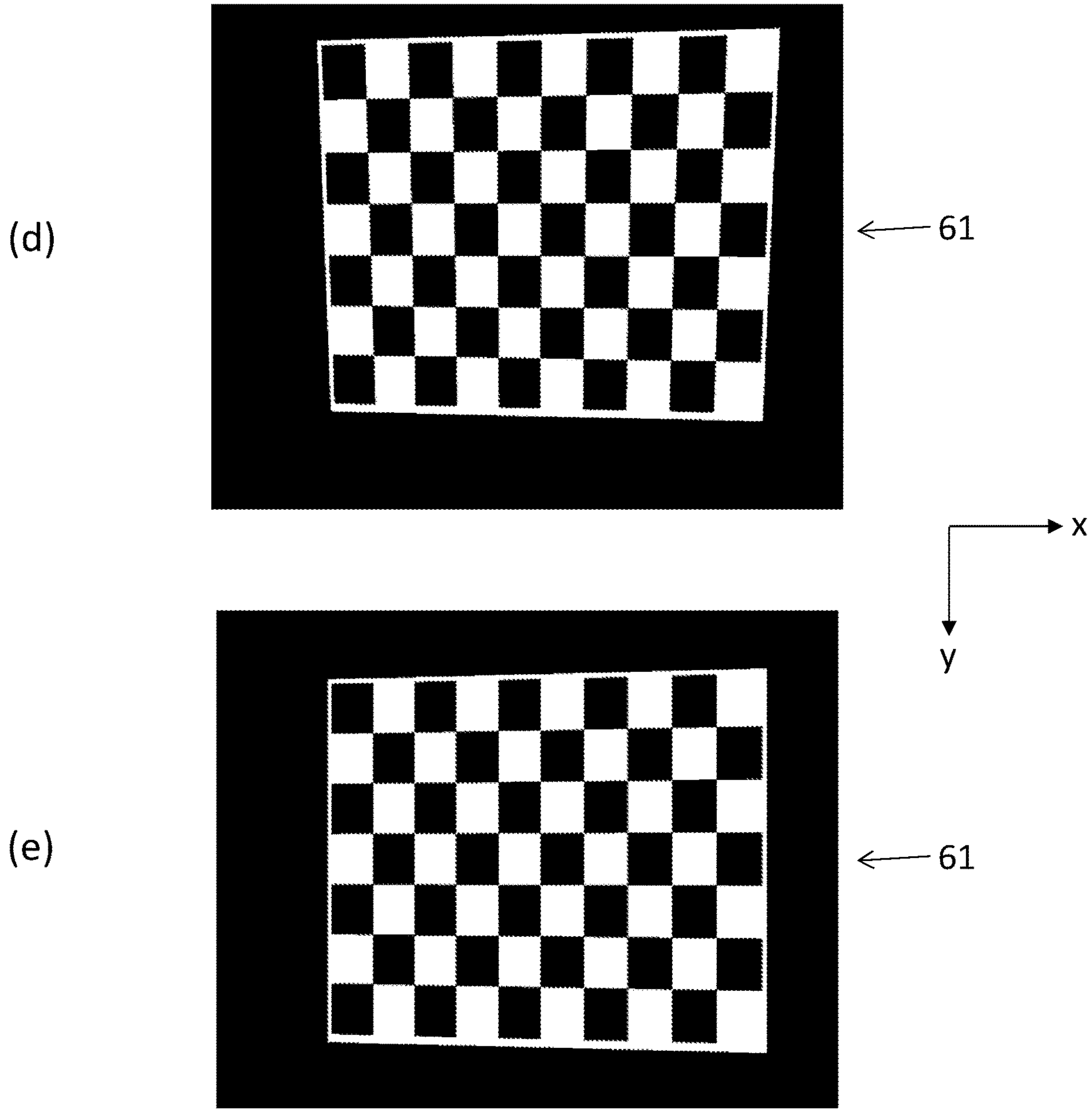
Figure 12:
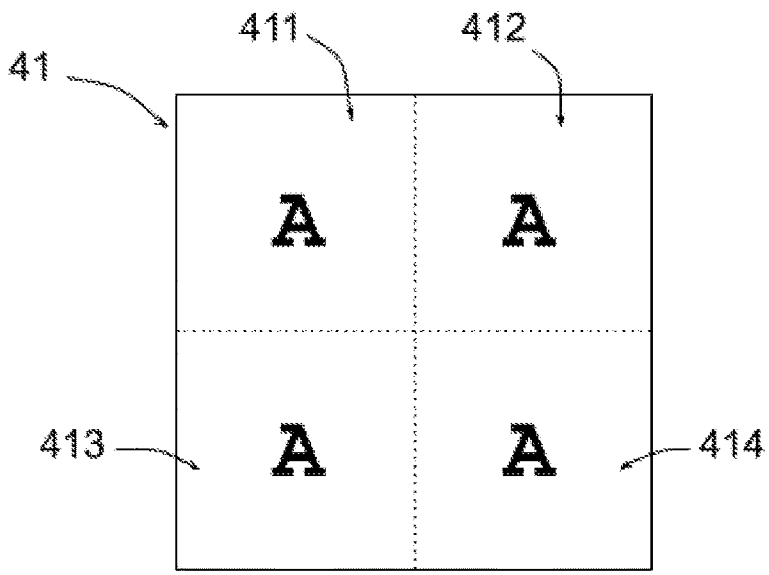
Figure 13:
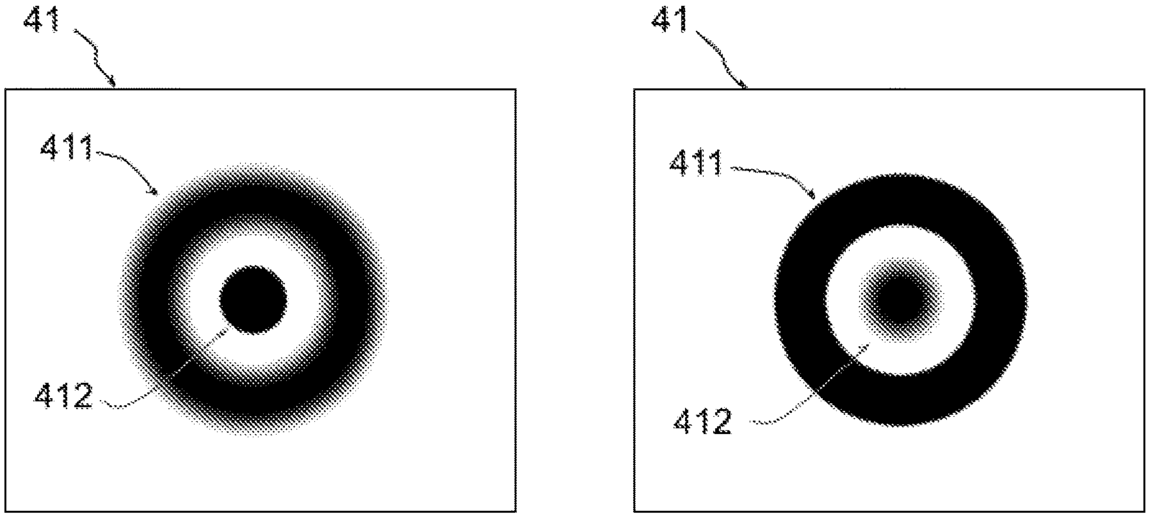
Figure 14:
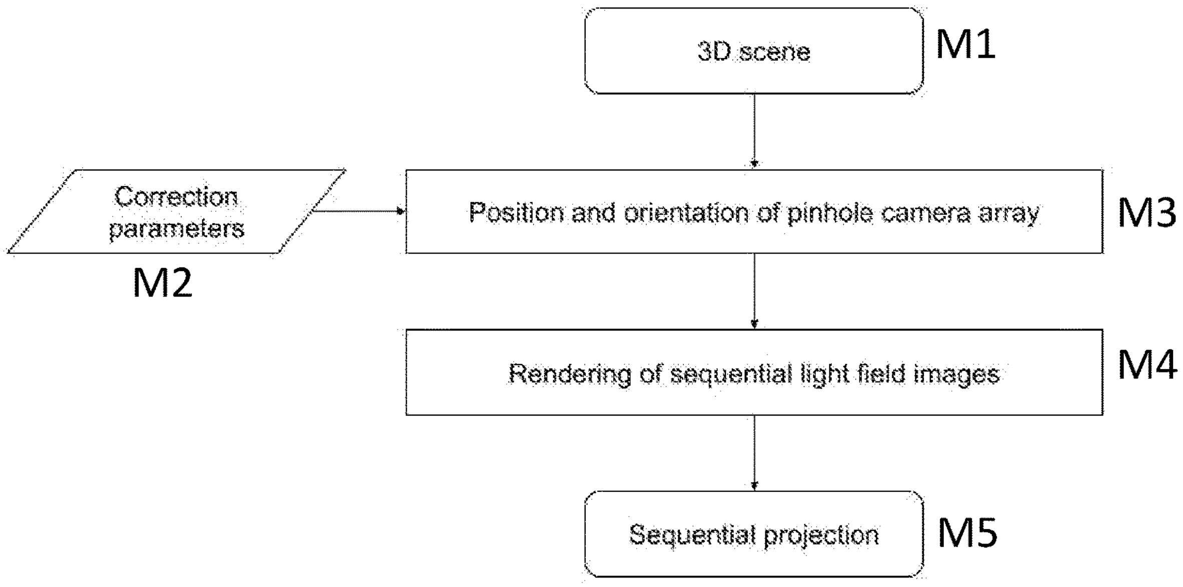
Figure 15:
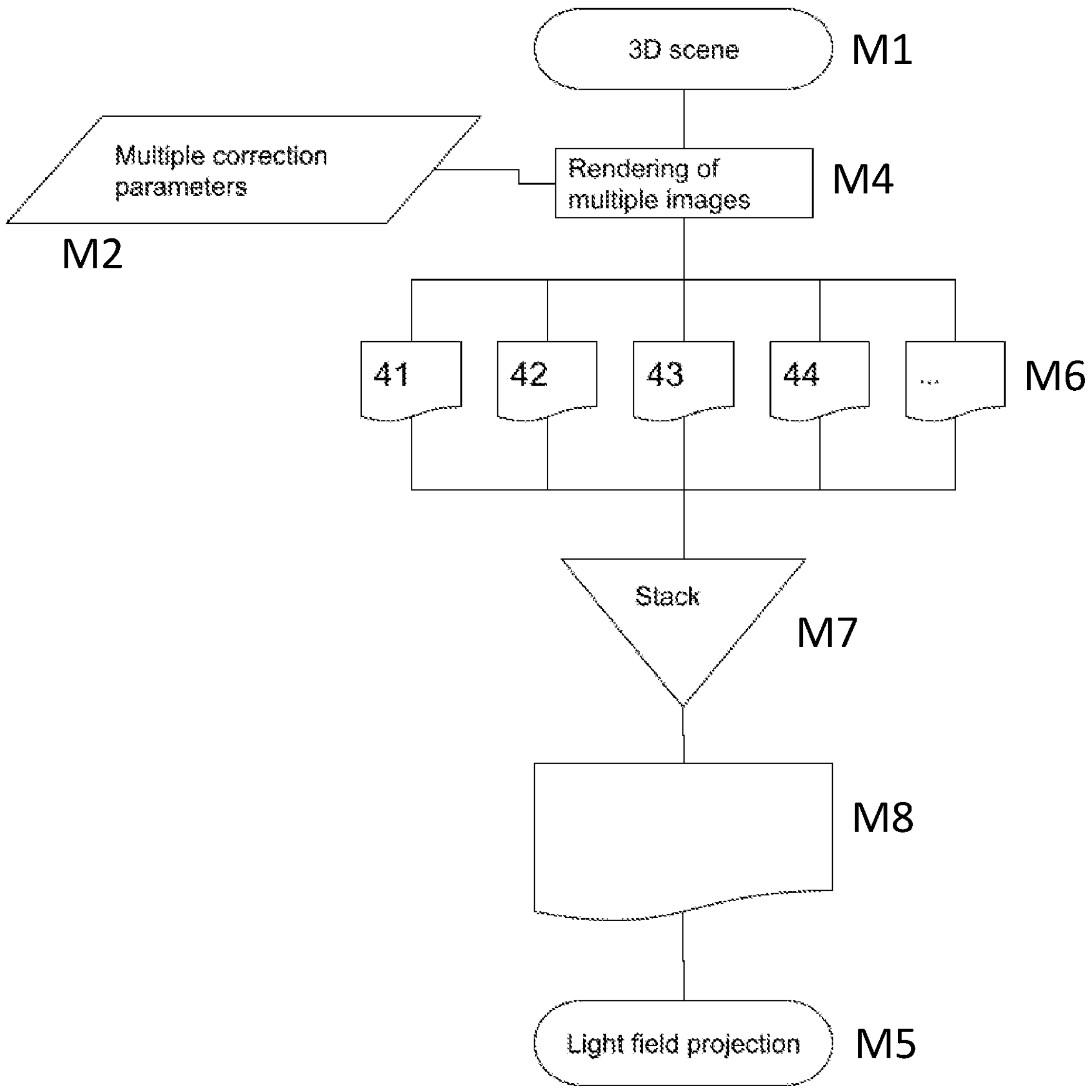

FIG. 4 shows a two-dimensional representation of the light field projector in the absence of optical correction;

FIG. 5 shows a two-dimensional representation of the light field projector with virtual pinhole cameras configured to simulate a negative refractive correction, according to an embodiment;

FIG. 6*a* shows the light field projector in the absence of correction;

FIG. 6*b* shows the light field projector producing a negative refractive correction, according to an embodiment;

FIG. 7 shows a two-dimensional representation of the light field projector with virtual pinhole cameras configured to simulate a positive refractive correction, according to an embodiment;

FIG. 8 shows a two-dimensional representation of the light field projector with virtual pinhole cameras configured to simulate a prismatic refraction correction, according to an embodiment;

FIG. 9 shows a three-dimensional representation of the light field projector with virtual pinhole cameras, according to an embodiment;

FIG. 10 shows a three-dimensional representation of the light field projector with virtual pinhole cameras configured to simulate a cylindrical correction, according to an embodiment;

FIGS. 11*a*-11*e* represent corrected SLM image patterns in the SLM plane corresponding to no correction (FIG. 11*a*), negative refractive correction (FIG. 11*b*), positive refractive correction (FIG. 11*c*), cylindrical correction (FIG. 11*d*), and prismatic refraction correction (FIG. 11*e*);

FIG. 12 illustrates a virtual image comprising a plurality of virtual objects, according to an embodiment;

FIG. 13 illustrates a virtual image comprising two virtual objects, each being displayed with a different correction;

FIG. 14 illustrates a method for generating corrected virtual images by using the light field projector, according to an embodiment;

FIG. 15 illustrates the method, according to a variant; and

Figure 16:
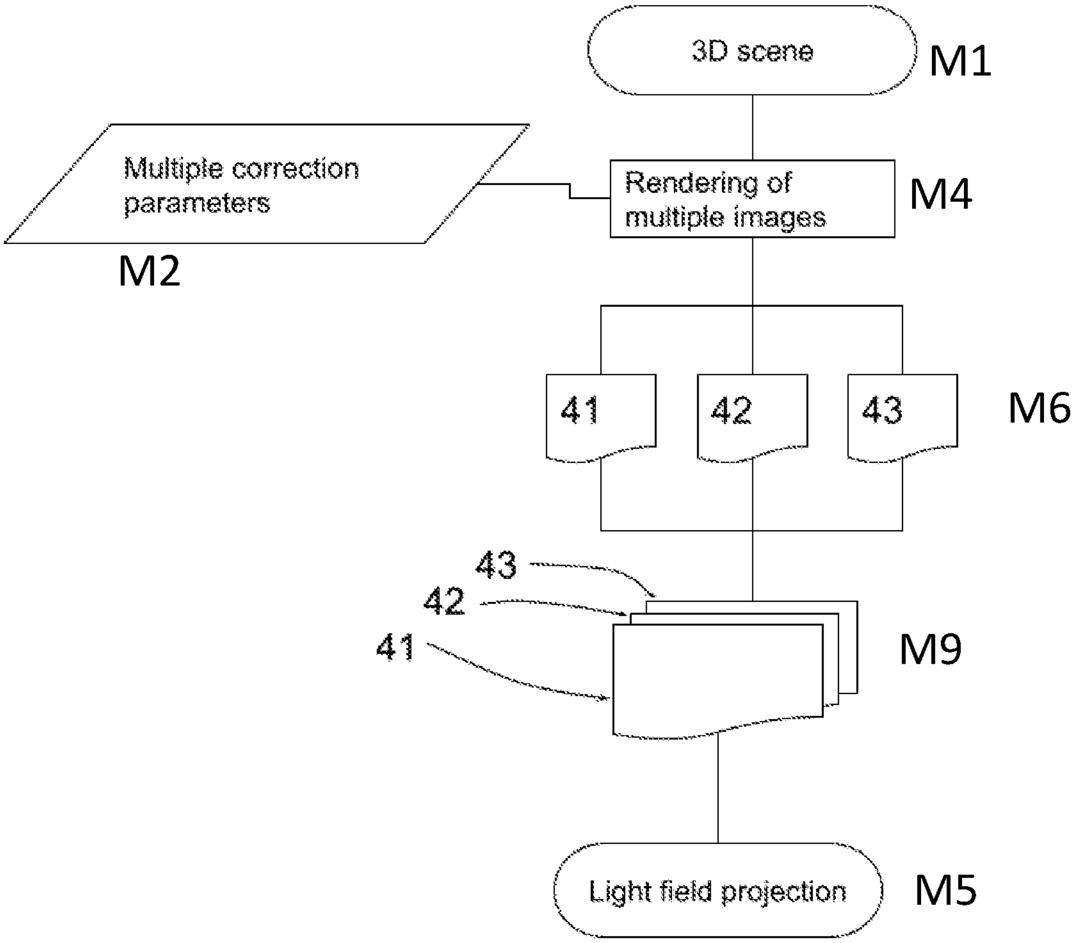

FIG. 16 illustrates the method, according to another variant.

EXAMPLES OF EMBODIMENTS

Figure 1:
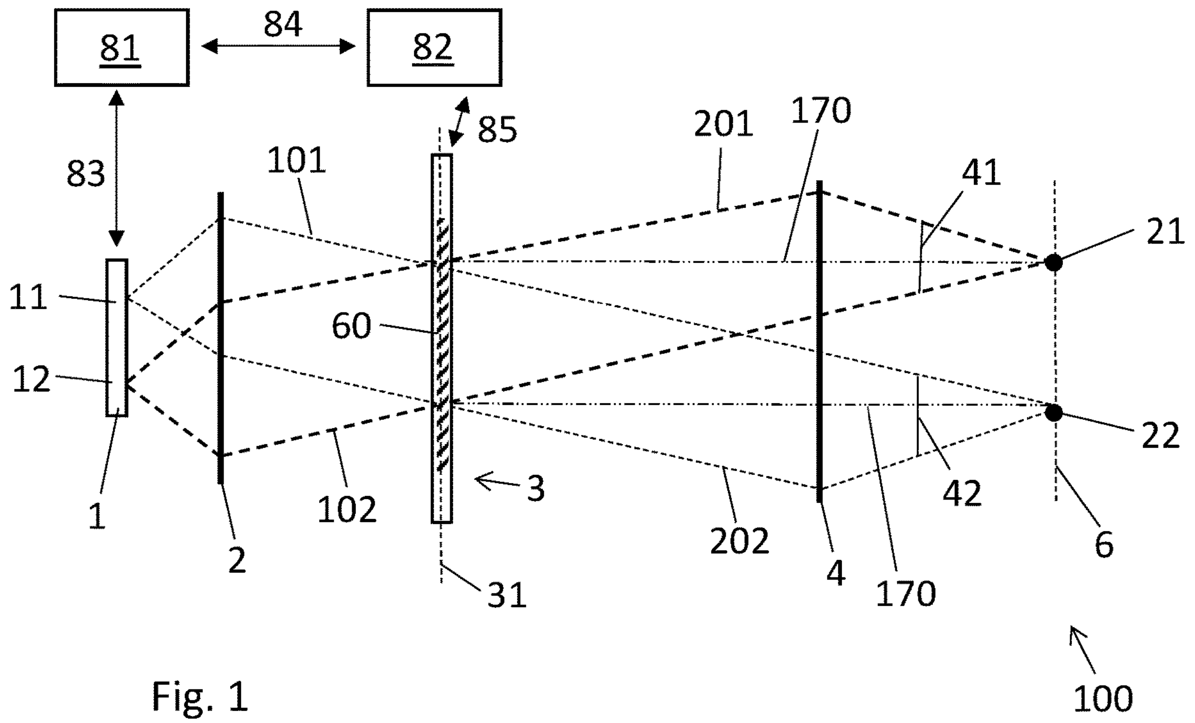
FIG. 1 is a representation of a light-field projector in a two-dimensional plane.

FIG. 1 is a representation of a light-field projector 100 in a two-dimensional plane. The light-field projector 100 comprises a light device 1 provided with a plurality of light sources (two point light sources 11 and 12 are shown in FIG. 1). The point light sources 11, 12 can be sequentially illuminated such as to sequentially emit a plurality of incident light fields 101, 102. The incident light fields 101, 102 are collimated with collimating optics 2 before sequentially illuminating a spatial light modulator (SLM) 3 under a different set of incident angles. The SLM 3 is configured to provide a reference SLM image pattern 60 in an SLM plane 31. The reference SLM image pattern 60 modulates each of the incident light field 101, 102, such as to generate modulated light fields 201, 202, in accordance with the reference SLM image pattern 60. Each modulated light field 201, 202 is modulated by the reference SLM image pattern 60 of the SLM 3 and carries out a corresponding image information. The light-field projector 100 can further comprise a projection optic 4 configured to project the modulated light fields 201, 202 along a reference projection axis 170. The projected modulated light fields 201, 202 sequentially form a plurality of virtual viewpoints 21, 22. The virtual viewpoints 21, 22 lie within an eye box 6, allowing a user to see an authentic 3D rendering of a digital scene.

The light device 1 can comprise an array of spatially disparate point light-sources 11, 12 to illuminate the SLM 3, each point light-source 11, 12 having a different orientation of a wave vector, in order to form the virtual viewpoints 21, 22.

Figure 2:
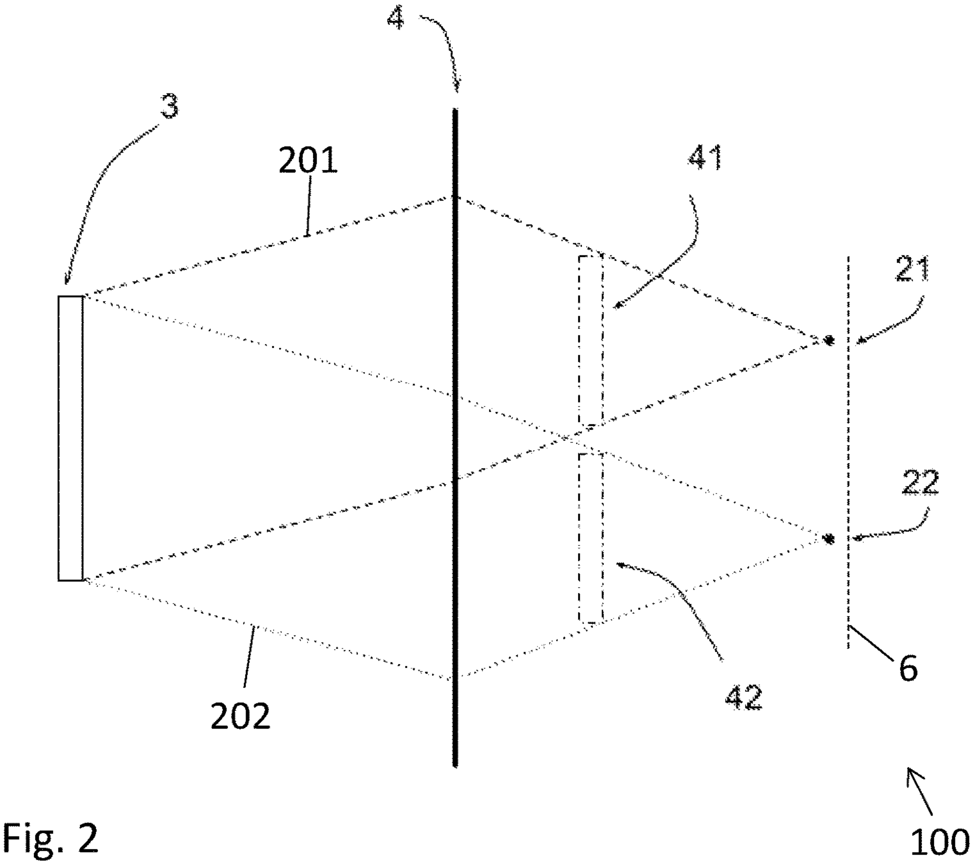
FIG. 2 shows a simplified version of the light field projector of FIG. 1.

FIG. 2 shows a simplified version of the light field projector 100 with the SLM 3 and the projection optic 4 of FIG. 1. Using the sequentially emitted plurality of incident light fields 101, 102, the projected modulated light-beams 201, 202 form virtual viewpoints 21, 22 and virtual images 41, 42, each virtual image 41, 42 reproducing the reference SLM image pattern 60 from the SLM 3.

Each virtual viewpoint 21, 22 can be represented as a virtual pinhole camera where the virtual image 41 of a 3D scene is projected on an image plane. The virtual images 41, 42 can then be computed by using the virtual pinhole cameras imaging a virtual 3D scene.

FIG. 3*a* shows a representation of a virtual pinhole camera where an image 41 of a 3D scene 30 is projected on a virtual image plane 401 through a pinhole 21, along the reference projection axis 170. FIG. 3*b* shows a two-dimensional representation of the pinhole camera of FIG. 3*a.*

FIG. 4 shows a two-dimensional representation of the light field projector 100, where an array of virtual pinhole cameras 21, 22, 23 are located in the plane of the eye box 6 (three virtual pinhole camera are shown). For each virtual pinhole camera 21-23, a virtual image 41-43 is respectively formed on the virtual image plane 401-403 of the virtual pinhole camera 21-23 and is projected along an apparent projection axis 171, 172, 173. Each virtual pinhole camera 21-23 (or each image 21-23) is respectively formed by a sequentially projected modulated light field (such as the modulated light fields 201, 202 shown in FIGS. 1 and 2). In the example of FIG. 4, the apparent projection axes 171, 172, 173 of the respective virtual images image 41-43 are parallel to each other and to the reference projection axes 170. This configuration corresponds to no optical correction, or to no optometric error (emmetropia).

FIGS. 5-8 show a representation of the light field projector 100 using virtual pinhole cameras with virtual image planes, according to an embodiment, where the virtual pinhole cameras are configured such as to simulate an optical transformation corresponding to an optometric error.

More particularly, FIG. 5 shows the light field projector 100 where the virtual pinhole cameras 21, 22, 23 are configured such as to simulate negative refractive correction (myopia). Here, the virtual pinhole cameras 21-23 (and their respective virtual image planes 401-403) are oriented relative to the reference projection axis 170 such that their respective apparent projection axes 171-173 diverge relative to the reference projection axis 170, towards the 3D scene 30. In this configuration, the apparent projection axes 171, 172, 173 of the virtual pinhole cameras 21, 22, 23 converge on the same virtual focal point 25 on the reference projection axis 170, at a distance d from the virtual eye box 6. The value of the correction in dioptres is equal to 1/d, where d is the distance between the virtual focal point 25 and the virtual eye box 6. Here, the distance d is a negative distance. In other words, the virtual focal point 25 is located on the same side of the SLM 3, between the image of the SLM 3 and the virtual eye box 6.

FIGS. 6a and 6b illustrate light field projector 100 configured to apply the negative refractive correction. More particularly, the negative refractive correction is obtained by displaying a corrected SLM image pattern 61 on the SLM 3. In the present example, the reference SLM image pattern 60 and the corrected SLM image pattern 61 on the SLM 3 comprises a plurality of image components 601 (six image components are shown for illustrative purposes).

FIG. 6a shows the light field projector 100 in the absence of correction. Two virtual viewpoints 21, 22 (virtual pinhole cameras) are represented, through each of which a virtual image 41, 42 is visible sequentially. Each virtual image 41, 42 comprises the reference SLM image pattern 60, although the reference SLM image pattern 60 is only shown in virtual image 41. The image 60 might not be exactly the same for the virtual images 41 and 42, depending on the 3d scene. It is only the same image if the 3D scene is a flat scene at infinity. The reference SLM image pattern 60 is displayed on a first area of the SLM 3 where one of the image components 601 (represented in black) is aligned with the reference projection axis 170. Viewed from the virtual viewpoint 21, the image component 601 appears as if it was focused at infinity, since image component 601 is projected along an apparent projection axis 171 that is parallel to the reference projection axis 170.

In FIG. 6b, the corrected SLM image pattern 61 corresponds to the reference SLM image pattern 60 that is displayed on a second area of the SLM 3 that is shifted relative to the first area, where one of the image components 601 (represented in black) is no more aligned with the reference projection axis 170 but shifted relative to it (below the reference projection axis 170 in the example of FIG. 6b). Viewed from the virtual viewpoint 21, the image component 601 appears as if it was focused at a finite distance d at virtual focal point 25, since image component 601 is projected along an apparent projection axis 171 that converges towards the reference projection axis 170, at the negative distance d. In other words, the corrected SLM image pattern 61 provides the negative refractive correction.

The light field projector 100 can comprise a SLM control unit 82 (see FIG. 1) configured to control an SLM signal 85 which creates the SLM reference image pattern 60 and corrected SLM image pattern 61 on the SLM 3. The light field projector 100 can further comprise an illumination control unit 81 configured to control an illumination signal 83 which powers specific point light sources 11 and 12 of the light device 1 in a specific time dependent fashion. The SLM control unit 82 can be synchronized with the illumination control unit 81 via a synchronization communication signal 84.

FIG. 7 shows the virtual pinhole cameras 21-23 and their respective virtual image planes 401-403 that are arranged such as to simulate a positive refractive correction (hyperopia). Here, the corrected SLM image pattern 61 is configured to correspond to the virtual pinhole cameras 21-23 being rotated such that their respective apparent projection axes 171-173 converge towards the reference projection axis 170. In this configuration, the apparent projection axes 171-173 of the virtual pinhole cameras 21-23 converge on the same virtual focal point 25 towards the 3D scene 30. The virtual focal point 25 is located on the reference projection axis 170, at a distance d from the virtual eye box 6. The value of the correction in dioptres is equal to 1/d, where d is the distance between the virtual focal point 25 and the virtual eye box 6. Here, the distance d is a positive distance. In other words, the virtual focal point 25 is located away from the virtual eye box 6, on the opposite side of the SLM 3.

FIG. 8 shows the implementation of a prismatic refraction correction. A prismatic refraction correction is used in eyeglasses for correcting diplopia, or double vision. The prismatic refraction correction helps align two images, so that only one image is seen. Here, the corrected image pattern 61 is configured to correspond to the virtual pinhole cameras 21-23, and their corresponding virtual image planes 401-403 being oriented relative to the reference projection axis 170 such that their respective apparent projection axes 171-173 are parallel to each other and tilted relative to the reference projection axis 170. The virtual focal point is thus located at infinity.

Although nine virtual pinhole cameras 21-29 are shown in FIGS. 9 and 10, the light field projector 100 can comprise any number of virtual pinhole cameras.

FIG. 9 shows a three-dimensional generalization of the two-dimensional schematic representation of the pinhole camera array of the light field projector 100 in the configuration of FIG. 7. Nine virtual pinhole cameras 21-29 are shown lying in the plane of the eye box 6, with their corresponding apparent projection axes 171-179. Here, the apparent projection axes 171-179 converge towards the reference projection axis 170 at virtual focal point 25, at a positive distance d. The light field projector 100 is thus arranged to simulate a positive refractive correction.

FIG. 10 shows cylindrical corrections simulated by the pinhole camera array of FIG. 9. Here, the corrected SLM image pattern 61 is obtained by projecting the reference pattern 60 on the tilted pinhole camera plane. For small angles, this is roughly equivalent to a simple x-y shift in the SLM plane 31, but for larger angles there is also a "reprojection" on the plane perpendicular to the optical axis. This results in a slight shrinkage/enlargement of parts of the image, as explained in more detail below.

More particularly, the corrected SLM image pattern 61 can be configured to rotate the apparent main projection axis 171-179 along two orthogonal rotation axes with different virtual focal planes 51, 52, such that the virtual image 41-44 simulates a cylindrical correction. The cylindrical correction is applied by aiming the pinhole camera array at both axes and at the same time. In the example of FIG. 10, a first rotation axis 55 is parallel and coincident to a first rotation plane 53 and a second rotation axis 56 is parallel to a second rotation plane 54. The first rotation plane 53 is orthogonal to the second rotation plane 54. When the pinhole camera array is rotated around an axis parallel to the second rotation plane 54, the virtual focal point is in a first focal plane 51 that is closer to the virtual pinhole cameras 21-29 than a second focal plane 52 when the pinhole camera array is rotated in the second rotation plane 54 (i.e., when the reference SLM image pattern 60 is rotated in the second rotation plane 54). The first rotation axis 55 corresponds to the intersection of the first focal plane 51 and the first rotation plane 53. The second rotation axis 56 corresponds to the intersection of the second focal plane 52 and the second rotation plane 54. Locating the virtual focal point in the first and second focal planes 51, 52 can be achieved by shifting the reference SLM image pattern 60 in the SLM plane 31, in addition to its rotation. The degree of shifting can differ to obtain the different first and second focal planes 51, 52. More generally, the corrected SLM image pattern 61 can be obtained by rotating the first and second rotation planes 53 and 54 around an axis z substantially orthogonal to the SLM plane 31. The corrected SLM image pattern 61 is then configured to rotate the apparent main projection axis 171-179 around the first and second rotation axes 55 and 56 that are also rotated along this axis z.

Although nine virtual pinhole cameras 21-29 are shown in FIGS. 9 and 10, the light field projector 100 can comprise any number of virtual pinhole cameras.

The cylindrical corrections of FIG. 10 can correspond to astigmatism correction, where the first and second rotation plane 53, 54 correspond to tangential and sagittal meridians and simulate correction lens that has different radii of curvature in different planes (a cylindrical lens).

In addition to corrections described above, the light field projector 100 can be used to simulate arbitrary and more complex corrections by setting the pinhole camera directions independently.

As illustrated in FIGS. 11*a*-11*e*, the optical corrections are obtained by distorting geometrically the reference SLM image pattern 6 in the SLM plane 31.

FIG. 11*a* shows an exemplary reference SLM image pattern 60 in absence of distortion and optical correction. Here, the reference SLM image pattern 60 is a checkerboard pattern.

FIG. 11*b* shows the corrected SLM image pattern 61 adapted to simulate a negative refractive correction, FIG. 11*c* shows the corrected SLM image pattern 61 adapted to simulate a positive refractive correction and FIG. 11*d* shows the corrected SLM image pattern 61 adapted to simulate a cylindrical correction. The corrected SLM image pattern 61 corresponds to the checkerboard pattern being shifted in the SLM plane 31 (along two orthogonal directions x, y in the SLM plane 31) and comprising a non-uniform vertical shear distortion. The shift and distortion are obtained by reprojecting the reference SLM image pattern 60 on a tilted virtual image plane 401-403. For small tilt angles of the reprojected reference SLM image pattern 60, the corrected SLM image pattern 61 corresponds to the checkerboard pattern being simply shifted in the SLM plane 31.

FIG. 11*e* shows the corrected SLM image pattern 61 adapted to simulate a prismatic refractive correction. The corrected SLM image pattern 61 corresponds to the checkerboard pattern being shifted in the SLM plane 31 (here along direction x in the SLM plane 31) and comprising a uniform perspective distortion according to a plane, here along the horizontal plane.

In one aspect, the light field projector 100 can be configured to display a virtual image containing an arbitrary number of different corrections simultaneously. In other words, each virtual image 41, 42 can simulate a plurality of optical corrections. FIG. 12 illustrates such a virtual image 41. In this case, the projected modulated light field 201, 202 can generate a virtual image 41 comprising a plurality of sub-areas, or virtual objects for example four virtual images denoted by numerals 411, 412, 413, 414 in FIG. 12. Each virtual object 411, 412, 413, 414 can display a distinct object having a given optical correction. Thus, the virtual image 41 can comprise multiple optical corrections.

Another example of a light field image is described in FIGS. 13*a* and 13*b* where the projected modulated light fields 201, 202 form a virtual image 41 comprising a ring 411 and a circle 412, each being displayed with a different correction. In FIG. 13*a*, the ring 411 appears blurred and the circle 412 appears sharp at the same time, depending on the accommodation of the viewer. FIG. 132*b* shows a correction resulting in the reverse situation.

A method for generating corrected virtual images by using the light field projector 100 is shown in FIG. 14, according to an embodiment. The method comprises the steps of:

- computing at least one virtual image 41-44 by using a virtual pinhole camera model imaging a virtual 3D scene and displaying a reference SLM image pattern 60 in accordance with the computed virtual images (M1);
- generating at least one optical correction parameter (M2);
- shifting and/or rotating the reference SLM image pattern 60 as a function of said at least one optical correction parameter to obtain a corrected SLM image pattern 61 (M3);
- sequentially illuminating the SLM 3 by the incident light fields 101, 102 such as to generate at least one modulated light field 201, 202 configured to form said at least one virtual image 41-44 (M4); and sequentially projecting said at least one modulated light field 201, 202 to project said at least one virtual image 41-44 simulating said at least one optical correction (M5).

The steps of computing at least one virtual image 41-44, generating at least one optical correction parameter, and shifting and/or rotating the reference SLM image pattern 60 can be performed in the SLM control unit 82. The step of sequentially illuminating the SLM 3 can be controlled by the illumination control unit 81 and can be synchronized with the SLM control unit 82 via the synchronization communication signal 84.

In one aspect represented in FIG. 15, a plurality of modulated light fields 201, 202 are generated, each forming a virtual image 41-44 (M6). The virtual images 41-44 are formed separately where each virtual image 41-44 can simulate a distinct optical correction. The method can further comprise a step of sequentially stacking the plurality of virtual images 41-44 (M7) and a step of merging the virtual images 41-44 (M8). The merged virtual images 41, 42 are then projected (M5). The merged virtual images 41-44 can thus comprise a plurality of optical corrections.

In another aspect represented in FIG. 16, a plurality of modulated light fields 201, 202 are generated, each forming a virtual image 41-44 (M6). The virtual images 41-44 are formed separately (M9) where each virtual image 41-44 can simulate a distinct optical correction. The method can further comprise a step of projecting the virtual images 41-44 sequentially (M5). The sequential projection can be sufficiently fast such that as to be perceived by a viewer as a single image simulating the plurality of optical corrections.

It is understood that the present invention is not limited to the exemplary embodiments described above and other examples of implementations are also possible within the scope of the patent claims.

For instance, the light field projector can also comprise a holographic display, where an optical phased array (OPA) provides the functionality of the SLM, wherein adjustable surface elements of the OPA are used to generate the reference image pattern 60 and corrected image pattern 61.

REFERENCE NUMBERS AND SYMBOLS

1 light device
11, 12 point light source
100 light-field projector
101, 102 incident light field
170 reference projection axis
171-179 apparent projection axis
2 collimating optics
21-29 virtual viewpoint, virtual pinhole camera
25 virtual viewpoint, virtual focal point
201, 202 modulated light field
3 spatial light modulator
30 3D scene
31 SLM plane
4 projection optics
41-44 virtual image
401-403 virtual image plane
411-414 virtual object
51 first focal plane
52 second focal plane
53 first plane
54 second plane
55 first rotation axis
56 second rotation axis
6 eye box
60 reference SLM image pattern
61 corrected SLM image pattern
601 image component
81 illumination control unit
82 SLM control unit
83 illumination signal
84 synchronization communication signal
85 SLM signal
d distance

The invention claimed is:

1. Light-field projector for generating optically corrected virtual images, comprising:

a spatial light modulator (SLM);

a light device including a plurality of point light sources;

an illumination control unit controlling the light device to sequentially illuminate each point light source and emit an incident light field illuminating the SLM;

a SLM control unit controlling the SLM being to display a reference SLM image pattern in an SLM plane, the reference SLM image pattern being configured to modulate the incident light field and generate a modulated light field in accordance with the SLM image pattern; and a projection optic projecting the modulated light field along a reference optical axis, and project a virtual image along the reference optical axis;

wherein the SLM is further configured to display a corrected SLM image pattern, the corrected SLM image pattern being obtained by modifying the reference SLM image pattern as a function of at least one optical correction parameter;

wherein the corrected SLM image pattern corresponds to the reference SLM image pattern being shifted in the SLM plane;

wherein the corrected SLM image pattern is configured such that the projection optic projects the virtual image along an apparent projection axis that differs from the reference optical axis, such that the virtual image simulates at least an optical correction; and wherein the optometric correction comprises at least one of negative refractive correction, positive refractive correction, prismatic refraction correction, or cylindrical correction.

2. The light-field projector according to claim 1, wherein the corrected SLM image pattern corresponds to the reference SLM image pattern further comprising a geometrical distortion.

3. The light-field projector according to claim 2, wherein the geometrical distortion comprises a non-uniform vertical shear distortion, such as to simulate a negative or positive refractive correction, or a cylindrical correction.

4. The light-field projector according to claim 1, wherein the corrected SLM image pattern is configured to make the apparent projection axis converge on a virtual focal point on the reference optical axis, between the SLM and the virtual eye box, such that the virtual image simulates a negative refractive correction.

5. The light-field projector according to claim 1, wherein the corrected SLM image pattern is configured to make the apparent projection axis converge on a virtual focal point on the reference optical axis away from the virtual eye box on the opposed side of the SLM, such that the virtual image simulates a positive refractive correction.

6. The light-field projector according to claim 1, wherein the corrected SLM image pattern corresponds to the reference SLM image pattern further comprising a geometrical distortion comprising a uniform perspective distortion according to a plane perpendicular to the SLM plane; and wherein the corrected SLM image pattern is configured to make the apparent projection axis parallel to each other and tilted relative to the reference optical axis, such that the virtual image simulates a prismatic refraction correction.

7. The light-field projector according to claim 1, wherein the corrected SLM image pattern is configured to rotate the apparent projection axis around an axis substantially orthogonal to the SLM plane.

8. The light-field projector according to claim 1, wherein the corrected SLM image pattern is configured to rotate the apparent projection axis along two orthogonal rotation axes with different virtual focal planes, such that the virtual image simulates a cylindrical correction.

9. The light-field projector according to claim 8, wherein the two orthogonal rotation axes are substantially parallel to, respectively, a first rotation plane corresponding to a tangential meridian and a second rotation plane corresponding to a sagittal meridian having different radii of curvature in different planes.

10. The light-field projector according to claim 1, wherein each virtual image comprises a plurality of optical corrections.

11. A method for generating corrected virtual images by using a light field projector comprising:

a SLM;

a light device including a plurality of point light sources, each point light source being configured to emit an incident light field illuminating the SLM;

the SLM being configured to display a reference SLM image pattern in an SLM plane, the reference SLM image pattern being configured to modulate the incident light field and generate a modulated light field in accordance with the SLM image pattern; and a projection optic configured to project the modulated light field along a reference optical axis, and project a virtual image along the reference optical axis;

wherein the SLM is further configured to display a corrected SLM image pattern;

wherein the corrected SLM image pattern corresponds to the reference SLM image pattern being shifted in the SLM plane; and wherein the corrected SLM image pattern is configured such that the projection optic projects the virtual image along an apparent projection axis that differs from the reference optical axis, such that the virtual image simulates at least an optical correction;

the method comprising:

computing at least one virtual image by using a virtual pinhole camera model imaging a virtual 3D scene and displaying a reference SLM image pattern in accordance with the computed virtual image;

generating at least one optical correction parameter;

modifying the reference SLM image pattern as a function of said at least one optical correction parameter to obtain a corrected SLM image pattern;

sequentially illuminating the SLM by the incident light fields such as to generate at least one modulated light field configured to form said at least one virtual image; and sequentially projecting said at least one modulated light field to project said at least one virtual image simulating said at least one optical correction.

12. The method according to claim 11, wherein the corrected SLM image pattern corresponds to the reference SLM image pattern further comprising a non-uniform vertical shear distortion or a uniform perspective distortion according to a plane perpendicular to the SLM plane.

13. The method according to claim 11, comprising generating a plurality of modulated light fields, each modulated light fields forming a virtual image;

wherein the virtual images are formed separately, each virtual image simulating a distinct optical correction.

14. The method according to claim 13, further comprising sequentially stacking the plurality of virtual images; merging the virtual images; and projecting the merged virtual images.

15. The method according to claim 13, further comprising projecting the virtual images sequentially.

16. Light-field projector for generating virtual images simulating an optical transformation corresponding to an optometric error, comprising:

a light device including a plurality of point light sources, an illumination control unit controlling an illumination signal powering each point light source to sequentially emit a plurality of incident light fields that sequentially illuminate a spatial light modulator (SLM) under a different set of incident angles;

an SLM control unit controlling an SLM signal to display a reference SLM image pattern in an SLM plane of the SLM, the reference SLM image pattern being configured to modulate each incident light field of the plurality of incident light fields and generate corresponding modulated light fields in accordance with the SLM image pattern; and a projection optic projecting the modulated light fields along a reference optical axis, and project a virtual image along the reference optical axis and to sequentially form a plurality of virtual viewpoints lying within an eye box;

wherein the SLM control unit further controls the SLM signal to display a corrected SLM image pattern;

wherein the corrected SLM image pattern corresponds to the reference SLM image pattern being shifted in the SLM plane; and wherein the corrected SLM image pattern is configured such that, for at least one of the virtual viewpoints, the projection optic projects the virtual image along an apparent projection axis that differs from the reference optical axis, such that the apparent projection axis is oriented relative to the reference projection axis to simulate said optical transformation corresponding to an optometric error.

17. Light-field projector for generating optically corrected virtual images, comprising:

a spatial light modulator (SLM) defining an SLM plane;

a light device comprising a plurality of spatially disparate point light sources;

an illumination control unit controlling the light device to sequentially illuminate said point light sources to sequentially emit incident light fields;

an SLM control unit controlling the SLM to display a reference SLM image pattern and to modulate each incident light field to generate corresponding modulated light fields; and a projection optic sequentially projecting the modulated light fields along a reference projection axis to form a plurality of virtual viewpoints within an eye box and to form at least one virtual image;

wherein the SLM control unit is further configured to generate at least one optical correction parameter and, as a function of the optical correction parameter, to cause the SLM to display a corrected SLM image pattern;

wherein the corrected SLM image pattern is derived from the reference SLM image pattern by at least a lateral shift in the SLM plane, and/or by at least one of a rotation and a geometrical distortion;

and wherein the corrected SLM image pattern is configured such that the projection optic projects the virtual image from the virtual viewpoints along respective apparent projection axes that differ from the reference projection axis in a manner that simulates at least one optometric correction, including at least one of negative refractive correction, positive refractive correction, prismatic refraction correction, or cylindrical correction.

* * * * *